C. J. PUGH.
DUST AND DIRT CAP FOR FRONT AXLE ENDS.
APPLICATION FILED MAY 17, 1920.
1,382,671.
Patented June 28, 1921.
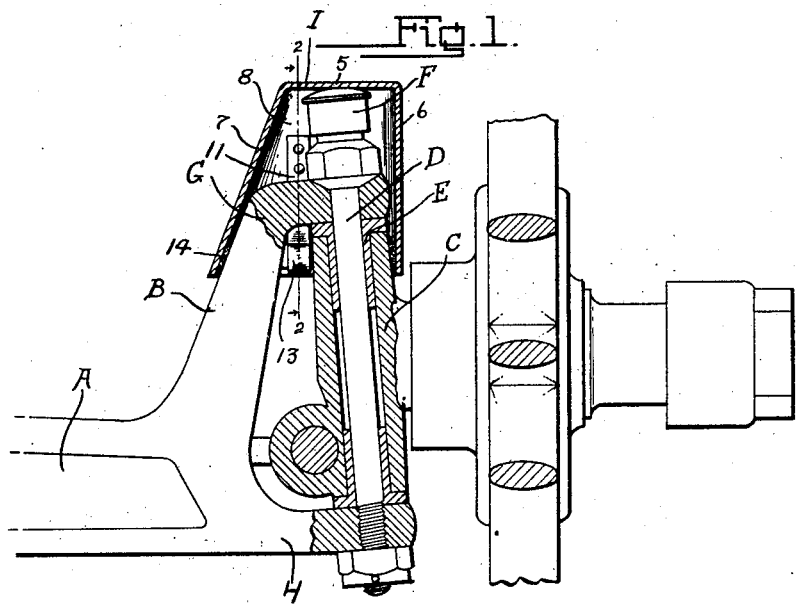
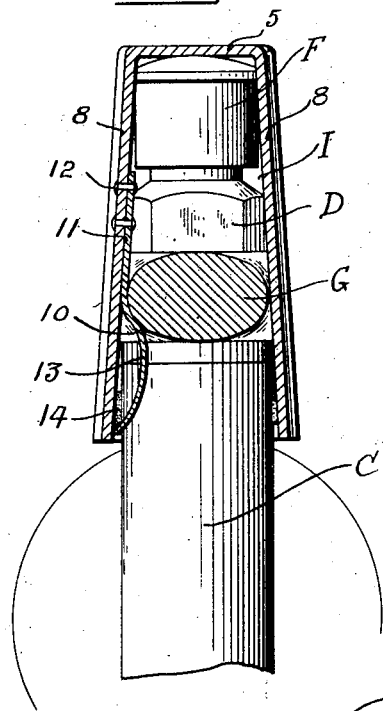
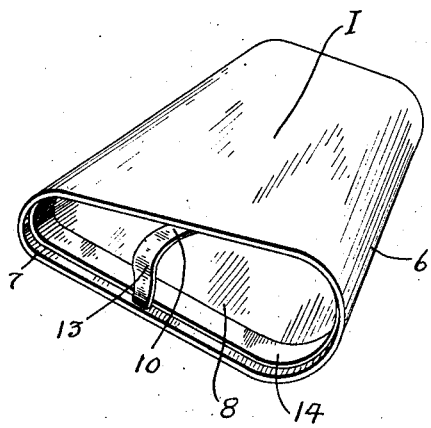
Inventor
C. J. Pugh.
By Lancaster and Allwine
Attorneys

UNITED STATES PATENT OFFICE.

CHESTER JOE PUGH, OF IDA, LOUISIANA.

DUST AND DIRT CAP FOR FRONT-AXLE ENDS.

1,382,671. Specification of Letters Patent. Patented June 28, 1921.

Application filed May 17, 1920. Serial No. 382,060.

*To all whom it may concern:*

Be it known that I, CHESTER J. PUGH, a citizen of the United States, residing at Ida, in the parish of Caddo and State of Louisiana, have invented certain new and useful Improvements in Dust and Dirt Caps for Front-Axle Ends, of which the following is a specification.

This invention relates to dust and dirt protectors for bearings and the primary object of the invention is to provide an improved device for protecting the bearings of the spindle bolts of the steering knuckles of motor vehicles, from dust, dirt, rain and the like, so as to permit the easy steering of the vehicle at all times.

Considerable difficulty has been experienced in steering motor vehicles, owing to the fact that dust and dirt collects between the spindle bolts and spindle bushing, and often the oil ways in the bolts become clogged from the dirt and thereby prevent the effective use of the oil cup. It is therefore another object of the invention to provide a device which will completely house the oil cups and the upper ends of the front axle forks and thereby effectively prevent the entrance of foreign matter to the spindle bolt and bushing.

Another object of the invention is to provide an improved detachable dust cap for the upper ends of the steering wheel spindles which can be readily and quickly placed in and removed from operative position, by an ordinary layman.

A still further object of the invention is to provide an improved dust cap for cars of the above character which is durable in use, one that is simple and easy to manufacture, and one which can be placed upon the market at a reasonable cost.

With these and other objects in view, the invention consists in the novel construction, arrangement and formation of parts as will be hereinafter more fully described, claimed and illustrated in the accompanying drawings, forming a part of this specification, in which drawings:

Figure 1 is a detail fragmentary sectional view of one end of a front axle of a motor vehicle showing the steering knuckle attached thereto, and the improved dust and dirt cap in position, the cap also being shown in section.

Fig. 2 is an enlarged vertical section taken on the line 2—2 of Fig. 3.

Fig. 3 is a detail perspective view of the improved dust and dirt cap.

Referring to the drawings in detail, wherein similar reference characters designate corresponding parts throughout the several views, the letter A indicates a front motor vehicle axle having the usual forked terminal B for the reception of the steering knuckle C. The steering knuckle C and the fork B receive in the usual manner the spindle bolt D and the bushings E. The spindle bolt D is also provided with the usual oil cup F. The forked end of the axle A includes the upper arm G and the lower arm H and these arms engage the upper and lower ends respectively, of the steering knuckle B.

The improved dust cap I is adapted to fit over the oil cup F and the upper end of the spindle bolt D and to engage the upper arm G of the fork B. The improved dust cap I may be made of any desired material such as sheet metal or the like, and includes an upper rectangular shaped wall 5, a depending vertical end wall 6, and a downwardly and outwardly inclined end wall 7, and the side walls 8. The downwardly and outwardly inclined end wall 7 conforms to the inclination of the fork B so that the cap may snugly fit the same and this end wall is formed relatively narrower than the end wall 6 and the side walls 8 are gradually converged toward the end wall 7. The cap is so shaped as to conform to the general configuration of the upper end of the axle fork so that the same may snugly fit the fork and thereby positively exclude the entrance of all dirt and the like into the upper end of the fork, the spindle bolt and spindle bushing.

A leaf spring 10 is provided, for releasably holding the dust cap I in position against accidental displacement, and this leaf spring 10 includes a flat body 11 which is riveted or otherwise secured as at 12 to one of the side walls 8 of the cap. The lower end of the body is curved inwardly and arcuately as at 13 and is adapted to engage the lower surface of the upper arm G of the steering fork B. The lower end 13 of the spring 10 engaging the upper arm absolutely prevents the displacement of the cap from its operative position.

From the foregoing description it can be seen that an exceptionally simple and durable means has been provided for effectively covering the entire upper end of the axle spindle of the steering knuckle of a motor vehicle, so as to effectively prevent the entrance of dust and the like in between the spindle bolt and spindle bushings.

Changes in details may be made without departing from the spirit or scope of the invention.

A flexible band 14, such as felt or the like, is glued or otherwise secured to the inner surface of the cap adjacent to the lower end thereof. This felt pad 14 is adapted to form an intimate contact with the axle fork and bushing so as to absolutely preclude the possibility of mud, dirt and the like from splashing up under the cup.

I claim:

1. A dust protector arranged to house the upper end of the spindle bolt and the upper end of the forked terminal of the front steering knuckle of motor vehicles, comprising a housing, and a releasable catch arranged to detachably hold the housing in position against accidental displacement.

2. A dust protector for front axle ends comprising a housing having an upper wall, and depending side and end walls, the lower end of the depending side and end walls being arranged to snugly engage the outer surface of the upper arm of the fork of the axle end, and a spring clamp carried by the inner surface of the housing arranged to engage the upper arm of the fork.

3. A dust and dirt cap for front axle ends comprising an upper wall and depending side and end walls, and a flexible relatively narrow pad secured to the inner surface of the walls adjacent to the lower end thereof for frictionally engaging the upper fork of the front axle.

4. A dust and dirt cap for front axle ends of motor vehicles, comprising a flat upper wall, vertically disposed side walls, a vertically disposed end wall, and a downwardly and outwardly inclined end wall.

5. A dust and dirt cap for front axle ends of motor vehicles comprising an upper wall, a depending substantially vertically disposed end wall, a forwardly and downwardly inclined end wall of less width than the first mentioned end wall, depending side walls connecting the end walls, and a spring clip carried by one of the side walls.

CHESTER JOE PUGH.